Oct. 9, 1928.

L. E. WEBSTER

SHOVEL HANDLE

Filed Nov. 27, 1926

1,687,073

Inventor
Lewis E. Webster
By his Attorneys
Philipp Sawyer Rice & Kennedy

Patented Oct. 9, 1928.

1,687,073

UNITED STATES PATENT OFFICE.

LEWIS EDMOND WEBSTER, OF WILKES-BARRE, PENNSYLVANIA.

SHOVEL HANDLE.

Application filed November 27, 1926. Serial No 151,176.

This invention relates to shovel handles and more particularly to metal D-shaped handles which have wooden grips, that is to say, a handle including a sheet metal frame secured to the shovel stem at its lower ends and having a wooden grip secured at its upper ends.

It is an object of the invention to provide a handle of this kind which can be much more economically manufactured and which will, at the same time, have better wearing qualities than the D-shaped metal handles heretofore provided.

To this end, the present invention, stated generally, contemplates the provision of a handle, the frame of which is made of sheet metal parts which can be easily produced at small cost and can be easily and securely assembled together and about the shovel stem and grip by unskilled labor. It also contemplates the provision of a wooden grip having the required curvature to conform to the hand of the user and, at the same time, little, if any, tendency to splinter or break even under very rough usage.

It further contemplates a handle so constructed that it may be assembled on the stem so that a definite relation exists between the handle and the blade and so that this relation may be maintained accurately throughout the life of the shovel.

In the accompanying drawings—

Figure 8 is a perspective view of a part of the stem showing the location of the key seat; and, Figure 9 is a plan view of the blank used in making each half of the handle frame.

Figure 1:
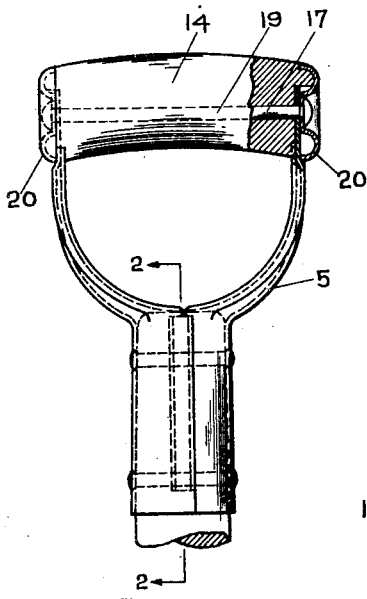
Figure 1 is a front elevation of the upper end of a shovel stem equipped with a handle embodying the features of the present invention.
Figure 2:
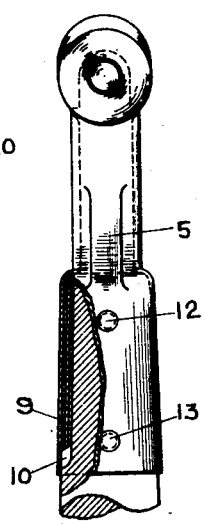
Figure 2 is a side view of the stem and handle shown in Fig. 1, with a portion cut away to show a section along the line 2—2 of Fig. 1, to illustrate features of the invention.
Figure 9:
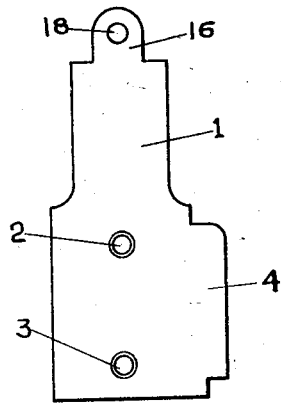

Referring to the drawings, two blanks 1, such as shown in Fig. 9, are stamped or otherwise cut from sheet metal, each of such a width as to be approximately half the circumference of the shovel stem. Each blank is then curved in suitable dies to conform to the curvature of the shovel stem and each is provided with openings 2, 3, for rivets by which the two parts are preferably secured to the shovel stem. The upper portion of the blank 1 is formed to a width slightly greater than the width of the finished handle so that a portion of the metal of each side may be turned in to provide reinforcement. The lower part of each blank is provided with a flange 4, more particularly hereinafter referred to. Preferably each blank is further reinforced by suitable ribs 5 (Fig. 2), formed by means of dies.

Figure 3:
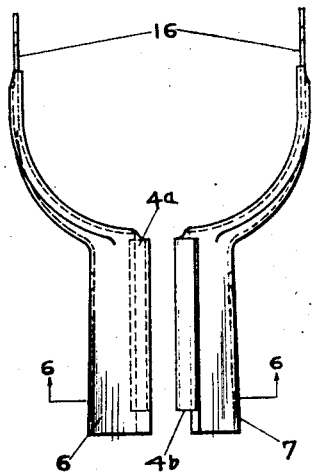
Figure 3 is a front elevation of the two main or side parts of the frame of the handle, the two parts being shown separated before assembling.
Figure 6:
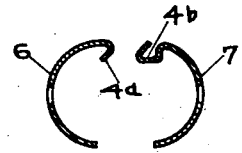
Figure 6 is a section on the line 6—6 of Fig. 3, showing those parts of the frame which form the socket for the shovel stem and also the flanges carried by these parts by which they are interlocked.
Figure 7:
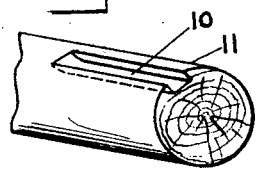
Figure 7 is a similar view showing these same parts assembled together with their flanges interlocked in final position.

Referring to Figs. 3, 6 and 7, the flange 4$^a$ of the part 6 is inwardly die-formed to constitute a single hook and flange 4$^b$ of the part 7 is inwardly and then outwardly formed to constitute a double hook for receiving the flange 4$^a$ of the part 6. Then these two halves are located with their flanges one within the other and placed in an assembling die where the upper part of the frame or D is absolutely true and square with the interlocked flanges. The die then interlocks the two parts 6 and 7 to form a socket for the reception of the shovel stem. The resulting socket is interlocked in such a manner that there are provided four thicknesses of material along the line which receives the greatest strain when the shovel is subjected to heavy prying and twisting, that is, the front of the shovel. Also, the fact that the opposite ends of the socket are slightly separated, as at 8, secures adjustability for different size stems and also allows for shrinkage and expansion in the stem under various weather conditions.

It is to be noted that the interlocking flanges, when suitably pressed together, present a smooth exterior surface and project inwardly in the socket to a depth of three thicknesses of socket material. This projection of material is taken advantage of to form a key 9 which, in conjunction with a key seat 10 formed in the stem 11 (Fig. 8), provides means for maintaining the handle and blade of the instrument in true relation so that under working conditions the handle may not be rotated about the stem. Furthermore, the provision of this key relieves the usual strain on rivets 12 and 13 which thus are only required to perform the function of holding the stem and handle together.

When the stems or shovel handles are manufactured they can be key-seated in perfect relation by means of the key 9 so that the handles will always be true with the shovel blade and in balance, and, when the shovels are put into heavy use, this key-seat will take care of the twist and strains and, further, will relieve the rivets 12 and 13, the heads of which are liable to be sheared off or the rivets stretched or bent.

Figure 4:
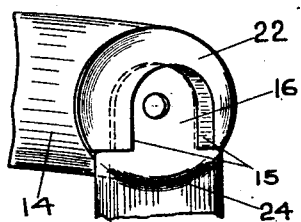
Figure 4 is an end view in perspective of the improved grip.
Figure 5:
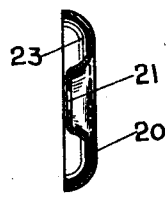
Figure 5 is a vertical section of one of the two ferrules designed to be connected with the ends of the grip and the tops of the two parts of the handle frame.

The grip 14 is preferably made of well-seasoned hard wood suitably shaped on its surface for convenient gripping by the hand. To this end, the grip will be machined perfectly smooth with the proper curvature to make a perfect bearing in the hollow of the user's hand. The ends of the grip are mortised vertically, as at 15, for the reception of the upper ends 16 of the frame parts 6, 7 (Fig. 4). This prevents rotation of the grip relatively to the frame.

The grip is permanently secured to the frame parts 6, 7, by a rivet 17 which passes through the openings 18 in the upper ends of the frame parts and through a longitudinal opening 19 in the grip. Ferrules 20, provided at each end of the grip, have like openings 21 through which the rivet 17 passes. These ferrules 20 fully encase the ends of the grip, covering up the rivet heads and acting as a handguard. For the reception of the ferrules, the grip is counterbored at its ends so as to provide at each end an annular projection 22, best shown in Fig. 4. Each ferrule 20 is countersunk at its center for the reception of the head of rivet 17 and is provided with an annular recess 23 which conforms to and fits snugly over the projection 22.

A seat 24 for the lower portion of the ferrule may be provided in the frame parts 6, 7, by stamping. The curvature of this seat will preferably conform to the curvature of the ferrule so that the latter will seat snugly, forming a metal-to-metal contact. The strains arising in the frame parts will therefore be taken directly by the ferrule instead of by the wooden grip. As before stated, the ferrule, therefore, not only performs the function of covering up the rivet heads and relieving the strains on the grip, but also provides a smooth handguard, being of such a shape as to feel most pleasant to the workman's hand.

As before indicated, all the frame parts and also the ferrules are preferably made of sheet metal suitably formed, by means of dies, to the desired shapes, and the assembling of these parts together and on the shovel stem is a very simple matter capable of being readily performed by unskilled labor.

The result is a saving in the cost of production both as to material cost and labor cost. Since the frame parts and ferrules are made from sheet metal, stamped and die-formed to the desired shapes and sizes, they have the advantage of being readily interchangeable. This not only makes their assemblage easy but also renders easy repairs to the shovel by the substitution of new for worn or broken parts.

What I claim is:

1. A shovel handle comprising a stem, a frame, a longitudinal slot in said stem, and a key in said socket portion coacting with said slot to prevent movement between the stem and socket.

2. A shovel handle comprising a stem, a frame having a socket portion into which said stem extends, a slot in said stem, and a key in said socket portion coacting with the slot to prevent relative movement between the stem and socket.

3. A shovel handle comprising a stem, a two-part frame, interlocking flanges for securing the parts together and constituting a key, and a coacting key seat in said stem whereby relative rotation of the stem and socket is prevented.

4. A shovel handle comprising a two-part metal frame interlocking flanges for securing the parts together, said flanges being so related as to present at least four thicknesses of metal along the line of maximum strain, said interlocked flanges also constituting a metal key.

5. A shovel handle comprising a stem, a two-part metal frame, interlocking flanges for securing the parts together said flanges being so formed as to present four thicknesses of metal along the line joining the parts and constituting a key, and a coacting key seat in said stem.

6. A handle comprising a metal frame having two parts each consisting of a yoke arm and a half socket portion, means to interlock the socket portions of said parts along at least one pair of their adjacent edges to form a complete socket said means comprising inwardly and outwardly extending flanges formed in a die so that the seam so made presents a smooth exterior surface, and an inward projection of several thicknesses of metal.

7. A handle comprising a frame having two parts, similarly located flanges on said parts for interlocking the parts along a portion of their edges, the flange of one part extending inwardly to be received in the socket-like flange in the other part, said flanges being clamped together to present a smooth exterior surface, and an inwardly extending key.

8. A shovel handle comprising a two-part frame, upwardly extending frame members, a grip located between said frame members, said grip being provided with endwise annular projections and having cut away portions, ferrules conforming to said annular projections and having countersunk rivet-receiving center portions, said frame members being formed to provide seats for the ferrules.

In testimony whereof, I have hereunto set my hand.

LEWIS EDMOND WEBSTER.